(12) United States Patent
Tsiatsikas et al.

(10) Patent No.: US 12,081,698 B2
(45) Date of Patent: Sep. 3, 2024

(54) METHOD FOR IMPROVING EMERGENCY RESPONSE TIME FOR MOBILE CALLERS

(71) Applicant: Unify Patente GmbH & Co. KG, Munich (DE)

(72) Inventors: Zisis Tsiatsikas, Salonika (GR); Manfred Kehr, Munich (DE); Eirini Michopanou, Athens (GR); Angelos Chitas, Athens (GR); Athanasios Pagonis, Vrilissia-Attiki (GR)

(73) Assignee: Unify Patente GmbH & Co. KG, Munich (DE)

( * ) Notice: Subject to any disclaimer, the term of this patent is extended or adjusted under 35 U.S.C. 154(b) by 354 days.

(21) Appl. No.: 17/700,664

(22) Filed: Mar. 22, 2022

(65) Prior Publication Data
US 2023/0033825 A1 Feb. 2, 2023

(30) Foreign Application Priority Data
Jul. 29, 2021 (EP) .................................... 21188628

(51) Int. Cl.
*H04M 3/51* (2006.01)
*H04W 4/02* (2018.01)
*H04W 4/90* (2018.01)
*G06Q 50/26* (2012.01)

(52) U.S. Cl.
CPC ........... *H04M 3/5116* (2013.01); *H04W 4/02* (2013.01); *H04W 4/90* (2018.02); *G06Q 50/26* (2013.01)

(58) Field of Classification Search
CPC ....... H04W 4/02; H04M 3/5116; H04M 3/523
See application file for complete search history.

(56) References Cited

U.S. PATENT DOCUMENTS

| | | | |
|---|---|---|---|
| 2008/0037715 A1* | 2/2008 | Prozeniuk | H04M 11/04 379/45 |
| 2009/0176474 A1 | 7/2009 | Bajko | |
| 2011/0026440 A1* | 2/2011 | Dunn | H04M 3/5116 370/259 |
| 2013/0203375 A1 | 8/2013 | Snapp et al. | |
| 2017/0366955 A1* | 12/2017 | Edge | H04W 36/22 |
| 2020/0314623 A1 | 10/2020 | Pellegrini et al. | |
| 2021/0084480 A1* | 3/2021 | Maier | H04W 4/90 |

FOREIGN PATENT DOCUMENTS

WO WO-2018125846 A1 * 7/2018 .......... H04M 3/5116

OTHER PUBLICATIONS

"NENA Detailed Functional and Interface Standards for NENA i3 Solution" Sep. 10, 2016, pp. 1-363; Copyright 2016 National Emergency Number Association, Inc.

\* cited by examiner

*Primary Examiner* — Kevin Kim
(74) *Attorney, Agent, or Firm* — Buchanan Ingersoll & Rooney PC (57) ABSTRACT

A method and a system for improving emergency response time for mobile callers can be configured to take advantage of knowledge regarding numerous devices and their states of services they offer. Embodiments of the method and system can be adapted to optimize the selection of one or more alternative destinations for a caller who may be moving while also avoiding unnecessary call re-routings.

15 Claims, 4 Drawing Sheets

METHOD FOR IMPROVING EMERGENCY RESPONSE TIME FOR MOBILE CALLERS

CROSS-REFERENCE TO RELATED APPLICATIONS

The present application claims priority to European Patent Application No. EP 21 188 628.8 filed on Jul. 29, 2021. The entirety of this European Patent Application is incorporated by reference herein.

FIELD

The present invention relates to a method and a system for improving emergency response time for mobile callers.

BACKGROUND

The Public Safety Answering Points (PSAP) comprise one of the most important elements of the Next Generation 911 (NG911) or Next Generation 112 (NG112) emergency architecture. This is true for two main reasons. The first one relates to the positioning of these elements within the Emergency Services IP Network (ESInet), and the second one to the fact that PSAPs host the actual trained professionals that will answer an emergency call. In this respect, it becomes apparent that the efficient selection of the appropriate PSAP that will handle the emergency call along with providing accurate data is very important for the overall handling of the emergency incident.

According to the NG911 architecture, an Emergency Selective Routing Proxy (ESRP) element will receive the emergency call and after being advised for the appropriate PSAP, with respect to the caller geolocation data, it will forward the call to the selected PSAP. In order to take this decision, the ESRP queries the Location Information Server (LIS) and the Emergency Call Routing Function (ECRF) server for the discovery of the most efficient PSAP according to the location data of the emergency caller.

In the prior art, several methods are known to obtain geolocation data from a caller and to assign a suitable PSAP to the caller based on this data. For example, U.S. Patent Application Publication No. 2007/0081635 A1 describes a method and apparatus for providing enhanced 911 for nomadic users. This invention deals with a method of providing GPS location data of a nomadic caller to the E911 service and not only users from fixed locations. This method describes the enabling of a GPS tracking device to be integrated with an IP endpoint so as for a Voice over Internet Protocol (VOIP) service to be able to route an E911 call to the appropriate PSAP, instructed by the caller's current location.

SUMMARY

We determined that the state of the art does not give any solutions to find the most appropriate PSAP, taking as a given that the call gets routed based on caller's current location in the first place after placing the emergency call. Because one problem that may appear during the routing of an emergency call relates to the selection of the appropriate PSAP, taking into account the alteration of the caller geolocation data and the actual incident. This is important since, according to the National Emergency Number Association (NENA), more than 80% of emergency calls originate from mobile users. So, if the mobile caller is in a queue at the PSAP, the mobile caller may change its location (for example, if it is in a car or other moving vehicle). If an emergency caller is routed on a PSAP at a first time or an initial time (e.g. a time, t0) and waits in the call queue and the waiting time could be 5 minutes or more, the position of the mobile caller can change while the caller is waiting on the call queue.

For example, a caller that travels with 100 km/h and waits on the call queue for 5 minutes, could cover approximately 8.5 km. This means that the previously selected PSAP may no longer be the one most suitable for answering the emergency call or a more suitable PSAP may be available that has a shorter waiting time for answering an emergency call, so that it would make sense to forward the emergency call of the mobile caller to this new PSAP. Take into account that the caller may be very close to the border of a different region which is covered by a different PSAP. This means that the caller can easily traverse the border between the 2 regions in less than 3 minutes.

An object for embodiments of the invention can be to discover an optimal PSAP element for a specific incident after the initial discovery has already been performed by the ESRP. Such a re-discovery can help with alternative routing, or a position alteration of the mobile caller that has occurred after the original routing process. Therefore, embodiments of the present invention can also address the object to identify the most appropriate PSAP for a queued call considering a possible new geolocation of the caller. Yet another object for embodiments of invention can include paying attention to a possible new geolocation of a caller while also working to quickly process the incident.

Embodiments of the invention can be structured as a server, a computer, a communication protocol, a network managing apparatus, a device that includes a processor connected to a non-transitory computer readable medium and at least one transceiver, a communication system, or a network.

For instance, an ESInet can be a managed internet protocol (IP) network that is used for emergency services communications, and which can be shared by all public safety agencies. It can provide the IP transport infrastructure upon which independent application platforms and core services can be deployed, including, but not restricted to, those necessary for providing NG911 or NG112 services. ESInets may be constructed from a mix of dedicated and shared facilities. ESInets may be interconnected at local, regional, state, federal, national and international levels to form an IP-based inter-network (network of networks). The term ESInet designates the network, not the services that ride on the network.

An Emergency Services Routing Proxy (ESRP) is a functional element which can be a Session Initiation Protocol (SIP) proxy server in some embodiments, The ESRP can be configured to select the next hop routing within the ESInet based on location and policy. There is an ESRP on the edge of the ESInet. There is usually an ESRP at the entrance to an NG911/NG112 PSAP. There may be one or more intermediate ESRPs between them. An ESRP can often be the first routing element within the NGCS (NG911/NG112 Core Services). It receives calls from the Border Control Function (BCF) at the edge of the ESInet.

A Public Safety Answering Point (PSAP) is an entity responsible for receiving emergency calls and processing those calls according to a specific operational policy. The PSAP can be a communication device that includes a processor connected to a non-transitory memory and at least one transceiver and also be connectable to or include one or more input devices (e.g. a keyboard, a mouse, a touch screen display), one or more output devices (e.g. a display).

In accordance with the invention, an Emergency Call Routing Function (ECRF) is a functional element in the ESInet which can comprise a Location to Service Translation (LoST) protocol server where location information (either civic address or geo-coordinates) and a Service URN (Uniform Resource Name) serve as input to a mapping function that returns a URI (Namespace Uniform Resource Identifier) used to route an emergency call toward the appropriate PSAP for the caller's location or towards a responder agency.

In accordance with the invention, a Location to Service Translation (LoST) is a protocol that takes location information and a Service URN and returns a URI. Used generally for location-based call routing. In NG911 or NG112, used as the protocol for the ECRF and Location Validation Function (LVF).

In accordance with the invention, a Uniform Resource Identifier (URI) is an identifier consisting of a sequence of characters matching the syntax rule that is named <URI> in Request for Comment (RFC) 3986. A URI can enable uniform identification of resources via a set of naming schemes. A URI can be further classified as a locator, a name, or both. The term "Uniform Resource Locator" (URL) refers to the subset of URIs that, in addition to identifying a resource, provides a way of locating the resource by describing its primary access mechanism (e. g. its network "location"). The term "Uniform Resource Name" (URN) has been used historically to refer to both URIs under the "urn" scheme [RFC2141], which are required to remain globally unique and persistent even when the resource ceases to exist or becomes unavailable and to any other URI with the properties of a name.

In accordance with the invention, a Location Information Server (LIS) is a functional element in an IP-capable originating network that provides locations of endpoints (i. e. calling device). The LIS can be a computer device that includes a processor connected to a non-transitory memory and at least one transceiver. A LIS can provide Location-by-Reference, or Location-by-Value, and, if the latter, in geo or civic forms. A LIS can be queried by an endpoint for its own location or by another entity for the location of an endpoint. In either case, the LIS receives a unique identifier that represents the endpoint, for example an IP address, circuit-ID or MAC address, and returns the location (value or reference) associated with that identifier. The LIS is also the entity that provides the dereferencing service, exchanging a location reference for a location value.

A method for improving emergency response time for mobile caller is provided. Embodiments of the method can include: queuing, by a Public Safety Answering Point (PSAP) element, an emergency call having a first geolocation and an incident ID associated with a caller; sending, by the PSAP element, a rebid request to a Location Information Server (LIS) to get information about the current geolocation of the caller; and identifying, by the PSAP element, if the first geolocation of the caller has changed. In the case the first geolocation has changed, receiving, by the PSAP element, a second geolocation of the caller from the LIS; pinging, by the PSAP element, a Location to Service Translation, LoST, element with the second geolocation of the caller; receiving, by the PSAP element, a destination PSAP (dPSAP) for the second geolocation of the caller from the LoST element; and routing the call to the dPSAP. If the geolocation of the caller has not changed, then nothing else may be done other than to continue to monitor or periodically check on the location of the caller to continue to verify the geolocation has not significantly changed.

According to a preferred embodiment, the first geolocation can have a radius r<x in relation to an incident scene and the second geolocation can have a radius r>x in relation to the incident scene, wherein x is a distance parameter. A minimum value for x of 2 km, preferably of 1 km and particularly preferably of 500 m has been found to be suitable for some embodiments. It has also been found practical to use a value for x>300 m and/or less than or equal to 2 km.

According to another preferred embodiment, the step of sending a rebid request is periodically performed with a preconfigured polling frequency. A minimum value for preconfigured polling frequency of 90 seconds, preferably of 60 seconds and particularly preferably of 30 seconds has been found to be suitable for some embodiments. It has also been found practical to use a value for x>10 seconds and x is less than or equal to 90 seconds.

According to still another preferred embodiment, the step of sending a rebid request can include after the first rebid request identifying the caller as a moving caller and increasing the polling frequency, otherwise decreasing the polling frequency. This has the consequence that the moving caller location is handled more often, to have a more accurate decision about transferring the moving caller to another PSAP and on the other side to not overload the system with too many rebid requests about non-moving caller.

Further, according to a preferred embodiment, t0 can be the initial time the call is routed at the PSAP and t1 is the first time the call is queued in the queue of the PSAP, wherein t1>t0. In particular, according to this embodiment of the present invention the method is focused on the change of the caller geolocation after the original call routing. In this direction a scenario is considered where the call has not been answered yet, because there is an increased number of emergency calls and the agents cannot handle all calls in a fast manner.

According to yet another preferred embodiment, after receiving the dPSAP the call is not rerouted to the dPSAP but the method further comprises the following steps:
pinging an ESRP element, by the PSAP element with the incident identifier (incidentID) the first geolocation, the second geolocation, and the dPSAP element, to identify whether other emergency calls were routed from the ESRP element;
identifying, by the ESRP element, if another functional PSAP (fPSAP) can handle calls with same incidentID for the first geolocation or the second geolocation;
receiving, by the PSAP element, fPSAP destination(s) from the ESRP element for this incidentID;
identifying, by the PSAP element, if the dPSAP matches any fPSAP destination(s), in the case there is no match or the PSAP element has not received any fPSAP destination(s) form the ESRP;
routing call to dPSAP; otherwise
routing call to the fPSAP,
then ending the method.

According to yet another preferred embodiment, the identifying of the fPSAP can include using the following equation to identify an appropriate fPSAP $$\lim_{\substack{x \to geo1 \\ \delta \to t0}} f(x, t) = 0, \ f(x, t) = x - x_{or} + (t - t0)$$

with x is a distance parameter converging to the first geolocation, geo1, δ is a time parameter converging to t0, t is time and $x_{or}$ is the geolocation from which the call was placed at t0. As noted above, a minimum value for x of 2 km, preferably of 1 km and particularly preferably of 500 m has been found to be suitable for some embodiments. It has also been found practical to use a value for x>300 m. A minimum value for δ of 10 minutes, preferably of 5 minutes and particularly preferably of 2 minutes has also been found to be suitable for some embodiments.

According to yet another preferred embodiment, the step of receiving the dPSAP and/or identifying the fPSAP the method using preconfigured policy rule function, PRF, to identify an appropriate dPSAP and/or fPSAP.

According to yet another preferred embodiment, in the step of identifying, if the dPSAP matches any fPSAP destination(s), in the case there is no match or the PSAP element has not received any fPSAP destination(s) form the ESRP, the method can also include:
  identifying, by the PSAP, if the absolute queue position or the relative queue position of the call in the dPSAP is smaller as in its own queue,
  if yes, routing call to dPSAP;
  in case there is a match, then the PSAP can identify if the absolute queue position or the relative queue position of the call in the fPSAP is smaller as in its own queue and, if yes, routing call to the fPSAP,
  in any other case the call can remain in the queue of the PSAP element.

According to yet another preferred embodiment, the relative queue position can be calculated using the following equation:

$$rPos_{PSAPn} = Pos_{PSAPn}/mQ_{PSAPn}$$

with $rPos_{PSAPn}$ is the relative queue position of a call in PSAPn, $Pos_{PSAPn}$ is the current queue position of a call, $mQ_{PSAPn}$ is the maximum queue size and PSAPn is a certain PSAP with identifier n. Here the absolute position in the queue is not used, but the filling level of the queue as a reference point. For calculation of the relative queue position of the caller in the origin PSAP for example PSAP1 is $rPos_1$, the current position $Pos_1$ and the maximum queue size $mQ_1$ will be used $rPos_1 = Pos_1/mQ_1$. For the calculation of relative queue position of the caller in a proposed second PSAP for example PSAP2, $rPos_2$, the current number of calls in the queue of PSAP2 $Pos_2$ and the maximum queue size $mQ_2$ will be used $rPos_2 = Pos_2/mQ_2$. If $rPos_2$ is lower than $rPos_1$ it could be assumed that the time in call queue of PSAP2 is not longer than in PSAP1.

The LoST element can be at least one of a LoST server, an Emergency Call Routing Function (ECRF) server or a Location Validation Function (LVF) server and/or be elements that use at least one of a ECRF protocol, a LoST protocol or a LVF, protocol.

In situations where the call is ready to be established with a call taker, an update of the location of the caller can be performed. The data will be processed as described in the other embodiments and will be presented to the call taker. The call taker can then be aware that the caller is a moving caller. All retrieved location, transfers, a proposed PSAP (or a list of PSAPs) and the information about the call queue of that PSAP(s) can be displayed. With that information the call taker can decide to establish the call or transfer the call to a more suitable PSAP.

A system for improving emergency response time for mobile callers is also provided. Embodiments of the system can be adapted to perform an embodiment of the above discussed method, for example.

According to a preferred embodiment, the system can include at least an ESRP element, an ECRF or LoST element, a LIS element, a PSAP element and/or a dPSAP element.

According to another preferred embodiment, the system can also include at least a fPSAP element, a Policy Store Server (PSS) element and/or a Logging Client. A PSS is a functional element in the ESInet that stores policy documents/rules. A logging client is a component which is used for logging all the necessary information regarding an emergency call that enters an ESRP element.

A communication apparatus is also provided. Embodiments of the apparatus can include a device having a processor connected to a non-transitory memory and at least one transceiver. The device can configured to perform a method when the processor of the device runs code stored in the memory of the device. The method performed by the device can include: queuing an emergency call having a first geolocation and an incident identifier (incidentID) associated with a caller, sending a first rebid request to a Location Information Server (LIS) to get information about the current geolocation of the caller, and in response to identifying that the first geolocation of the caller has changed based on the information about the current geolocation of the caller:
  receiving a second geolocation of the caller from the LIS,
  pinging a Location to Service Translation (LoST) element with the second geolocation of the caller,
  receiving a destination PSAP (dPSAP) for the second geolocation of the caller from the LoST element, and
  routing the call to the dPSAP.

Some embodiments of the device can be a PSAP. Other embodiments can be another type of communication device. In some embodiments, the device can be included in an ESInet and be connected to one or more ESInet devices (e.g. an ESRP, other PSAPs, etc.).

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numerals used in the drawings include the following:
  call1 emergency call1;
  call2 emergency call1;
  radius<x radius less-than x meter to an incident scene;
  radius>x radius grater-then x meter to an incident scene;
  queue call queue of an emergency network element;

PRF Policy Routing Function;
ESRP Emergency Services Routing Proxy;
PSAP Public Safety Answering Point;
PSAP1 Public Safety Answering Point 1;
PSAP2 Public Safety Answering Point 2;
PSAP3 Public Safety Answering Point 3;
dPSAP destination Public Safety Answering Point;
fPSAP functional Public Safety Answering Point;
S210 Step S210 of the method;
S220 Step S220 of the method;
S230 Step S230 of the method;
S231 Step S231 of the method;
S240 Step S240 of the method;
S241 Step S241 of the method;
S250 Step S250 of the method;
S260 Step S260 of the method;
S261 Step S261 of the method;
S270 Step S270 of the method;
S271 Step S271 of the method;
S272 Step S272 of the method;
S273 Step S273 of the method;
S274 Step S274 of the method;
S280 Step S280 of the method;
S290 Step S290 of the method;
ECRF Emergency Call Routing Function;
LIS Location Information Server;
PSS Policy Store Server;
Logging Client component which is used for logging all the necessary information regarding an emergency call that enters an ESRP element;
Inc1 incident scene 1;
incidentID incident identification;
geo1 FIRST geolocation;
geo2 SECOND geolocation; and
LoST Location to Service Translation

DETAILED DESCRIPTION

Figure 1:
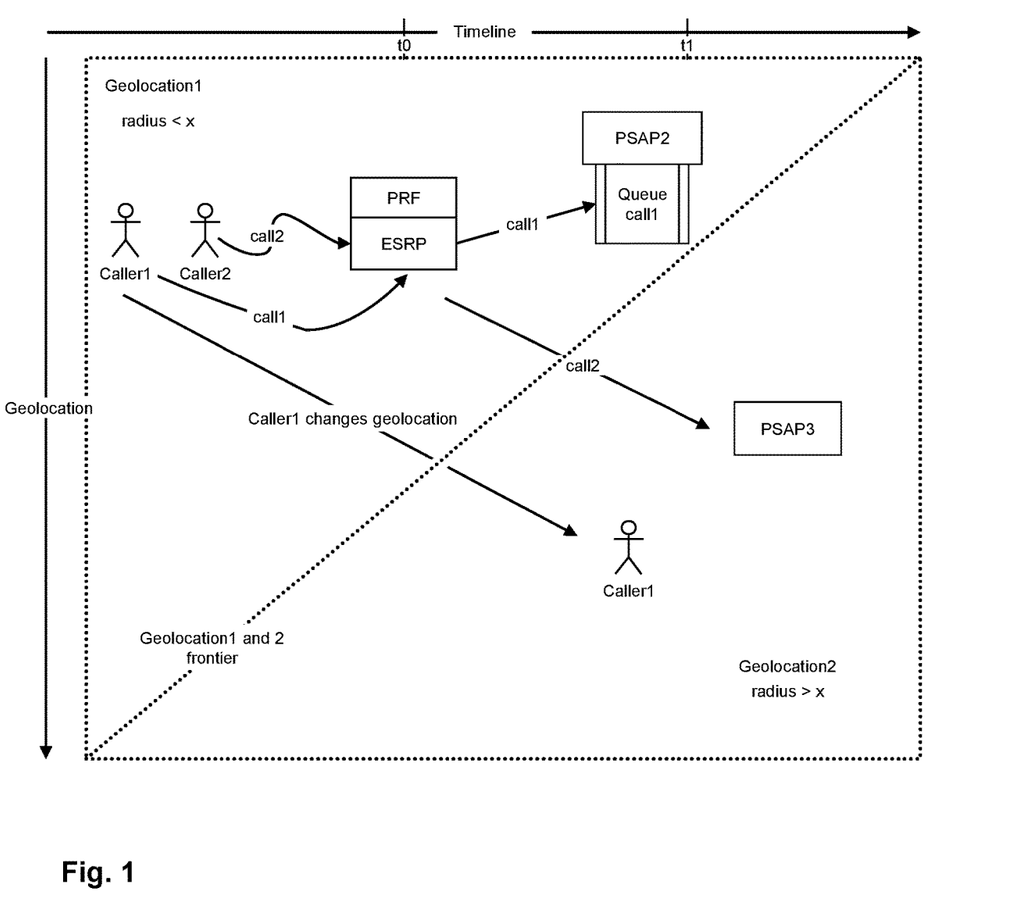
FIG. 1 shows a schematic illustration of the object according to the invention.

FIG. 1 schematically shows a schematic illustration of the object according to the invention. One problem that may appear during the routing of an emergency call relates to the selection of the appropriate PSAP, considering the alteration of the caller geolocation data and the actual incident. Here a mobile caller1 was routed on PSAP2 at t0 and waits in the call queue. Caller1 was at time t0 in a radius<x to the emergency incidence scene in geolocation1. At about the same time t0, another call2 from a second caller was received in the emergency call network (in this case an ESRP). However, this call2 was forwarded to PSAP3, even though this call2 was dealing with the same incident as call1 and was also made from the same geolocation1. This may happen, for example, because PSAP3, which is actually the most appropriate PSAP to handle this emergency call, was not available at t0 for call1 and therefore call1 was rerouted, possibly due to a policy rules function (PRF). It is also possible that the routing of call1 to the PSAP2 queue was due to not yet enough information to accurately determine the most appropriate PSAP for this incident.

However, caller1 is now moving away from the incident site while waiting in PSAP2's queue, so its geolocation changes from geolocation1 to geolocation2. The radius r to the incident scene also changes to r>x. Assumed the waiting time could be 5 minutes or more, the position of the mobile caller can change while the caller is waiting on the call queue. For example, a caller that travels with 100 km/h and waits on the call queue for 5 minutes, could cover approximately 8.5 km. This means that the previously selected PSAP2 may no longer be the one most suitable for answering the emergency call, or a more suitable PSAP3 may be available that has a shorter waiting time for answering an emergency call and has already handled calls according to this specific incident, so that it would make sense to forward the emergency call of the mobile caller to this new PSAP3. Take into account that the caller may be very close to the border of a different region which is covered by a different PSAP. This means that the caller can easily traverse the border between the 2 regions in less than 3 minutes. This is one of the obstacles which embodiments of the present invention can be able to solve.

Figure 2:
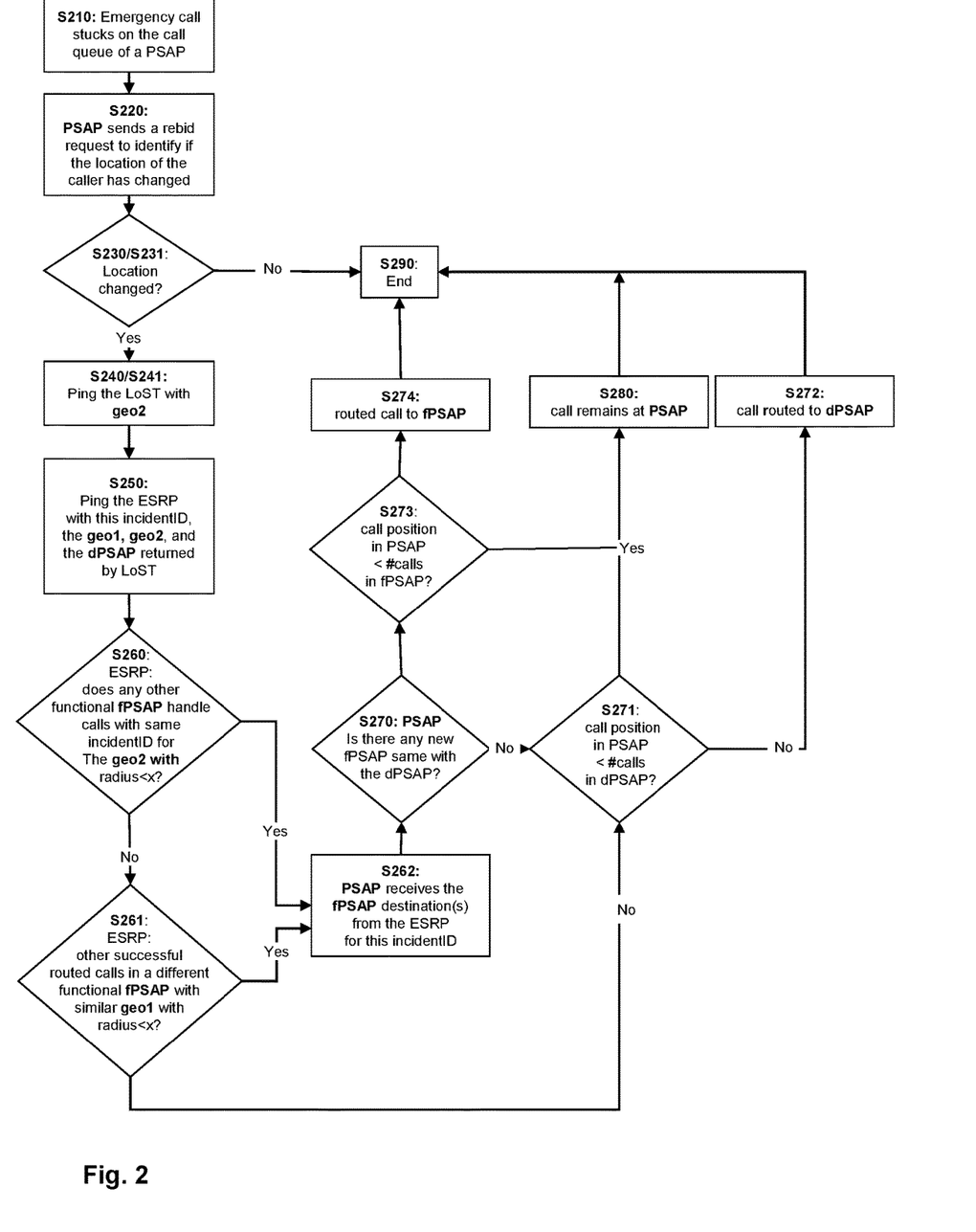
FIG. 2 shows a block diagram of the method for improving emergency response time for mobile callers according to an embodiment of the invention.

FIG. 2 shows a block diagram of a method for improving emergency response time for mobile callers according to an embodiment of the invention. The first step S210 of the method builds over a caller which has stuck on a PSAP call queue at the time frame t1. It is thereby assumed that the emergency incident that corresponds to this emergency call, has resulted on an increased number of calls in the same vicinity, at the same time frame. In the second step S220 the PSAP sends a rebid request to a LIS. For example, a rebid request can take place every x second(s)—using for example a timer for each call which is stuck on the call queue—, in order to identify if the emergency caller is moving. This could happen for example in case the caller initiated an emergency call from a specific FIRST geolocation (geo1) to the PSAP—with radius<x in meter in the region of the incident—and after a while, as the caller was waiting in the queue, the caller left the incident scene (i. e., distance>x in meter) to a different SECOND geolocation (geo2). In the next step S230 the PSAP identifies if the FIRST geolocation (geo1) has changed. If the geolocation has not changed, then the method ends S290. Otherwise, the PSAP receives the new geolocation from the LIS, namely the SECOND geolocation (geo2) data S231. Then in step S240, the PSAP pings an ECRF server with this newly received SECOND geolocation (geo2), while the call is still stuck on the queue. Assuming a successful delivery of the aforementioned responses from the LIS and the ECRF servers, PSAP holds both the SECOND geolocation (geo2) data and a new PSAP, namely the destination PSAP (dPSAP), which is the most appropriate to handle the caller's incident, with respect to the caller's SECOND geolocation (geo2). Keeping in mind that till this time frame, the caller is still waiting on the call queue of the PSAP, where the initial call was routed due to the LIS and ECRF queries performed during the standard routing process on the ESRP side. Further, keeping in mind that these queries are based on the FIRST geolocation (geo1) data (i. e., distance<x in meter). Thus, in S250 the PSAP pings the ESRP to identify whether other calls were routed from the ESRP element, at the same time frame t1+δ, taking into account also a relative geolocation which does not exceed x, as this was mentioned earlier. The ping request conveys both the FIRST and the SECOND geolocation (geo1, geo2) data, the incident ID and the dPSAP. Keeping in mind that both δ and x parameters are quite flexible per system and remain configurable by the system administrator.

In step S260 on the ESRP side, the method includes retrieving from the call history, say by exploiting the logging process service data, whether other calls have been routed in different functional PSAP (fPSAP) elements at the relative time frame t1+δ in that the initial call was routed on the PSAP. The diversion in different fPSAP elements could happen for example after applying a Policy Routing Function (PRF) rule on the ESRP. In case the ESRP identifies 2 calls with the same incidentID that have been routed in different fPSAP elements, then it returns the list of the fPSAP elements which served these calls. It is stressed that this is the more seldom case, because usually the calls receive a random incidentID at the time they enter the ESInet. However, there are real-life cases where the calls may be assigned the same incidentID. In the case, if the aforementioned step S260 is false, in the next decision taken at the ESRP side, the method will evaluate if there was any other call routed on a functional fPSAP, in t1+δ, considering also a radius<x S261. With an increased probability, as the x converges to the FIRST geolocation (geo1) data, and the δ parameter converges to the time the examined emergency call was placed, say t0, the calls which were initiated with these criteria will be relevant (i.e., the same emergency incident) to the emergency call which is examined, i.e., the one which is stuck on the call queue. The previous statement can be represented by the following equation.

$$\lim_{\substack{x \to geo1 \\ \delta \to t0}} f(x, t) = 0, f(x, t) = x - x_{or} + (t - t0)$$

where $x_{or}$ represents the geolocation from which the examined call was placed at time t0. It becomes apparent that the approach which is exploited to correlate calls which were routed on the same time frame, but in different PSAP elements, depends on the time frame and more specifically on the δ parameter, as well as the distance x. Then, in S262 the ESRP passes the results of the two previous steps to the PSAP. In S270 the method checks whether the dPSAP matches any fPSAP item in the list returned by the ESRP. In case the method finds a match, it checks if the new destination fPSAP has a smaller number of calls in the queue S273, in such a case PSAP routes directly the call to this destination in S274. In a different case, the PSAP needs to decide if the call will stay on the PSAP call queue S280, or it will be routed on the fPSAP S274.

The last decision can be taken based on the position of the current call on the FIFO (First in first out principle) call queue of the PSAP. That is, if the examined call appears for example in position 10 of the call queue, and the fPSAP has 20 calls in the queue, then the call must not be routed on the new destination because it will delay. On the other hand, if we know that a fPSAP handles the incident, then it will be far faster to get routed on this fPSAP. The reason for considering two decisions which exploit the FIRST and the SECOND geolocation data in the ESRP side, is related to the purpose of tracking calls that concern the same incident but routed on different PSAP elements. Thus, it is assumed that other calls were initiated when the caller was located in the FIRST geolocation. That is, to identify if at the same time that caller was located in the FIRST geolocation, other callers have initiated emergency calls for the same incident, but they were routed on different PSAP elements, say due to PRF functionality.

Embodiments of the method can build over a simple query on the ESRP that will make the proposed mechanism more robust, by deducing if the dPSAP is appropriate to handle the specific emergency incident. Keeping in mind that it is not intended only on the trivial retrieval of the element (i. e. the PSAP) state, but also to infer from a typical request, if the PSAP handles a similar incident. This can help in order to exploit the most appropriate PSAP element based on the new caller location.

To put it in a different way, it may not be enough to address the problem at hand only by obtaining the functional state of the discovered PSAP in some embodiments. Assuming for example that the discovered PSAP is set in state OVERLOAD. Thus, it is of interest to know which other PSAP elements may handle the same incident. This information can be important because if other PSAP elements have already handled the incident, then the new call will be handled faster. All in all, this method can take advantage of the ESRP's knowledge regarding numerous PSAPs and their states services they offer. ESRP will respond, taking into account successful routing of previous calls to each destination. This means that ESRP already knows if a PSAP is in overload or non-available state. Thus, the PSAP(s) that will be responded by ESRP will have all necessary information to avoid any further re-routing of the call. Thus, by using this method an optimization of the selection of an alternate PSAP destination for a caller in move is provided, taking advantage of information already known to the ESRP and avoiding unnecessary call re-routings.

Figure 3:
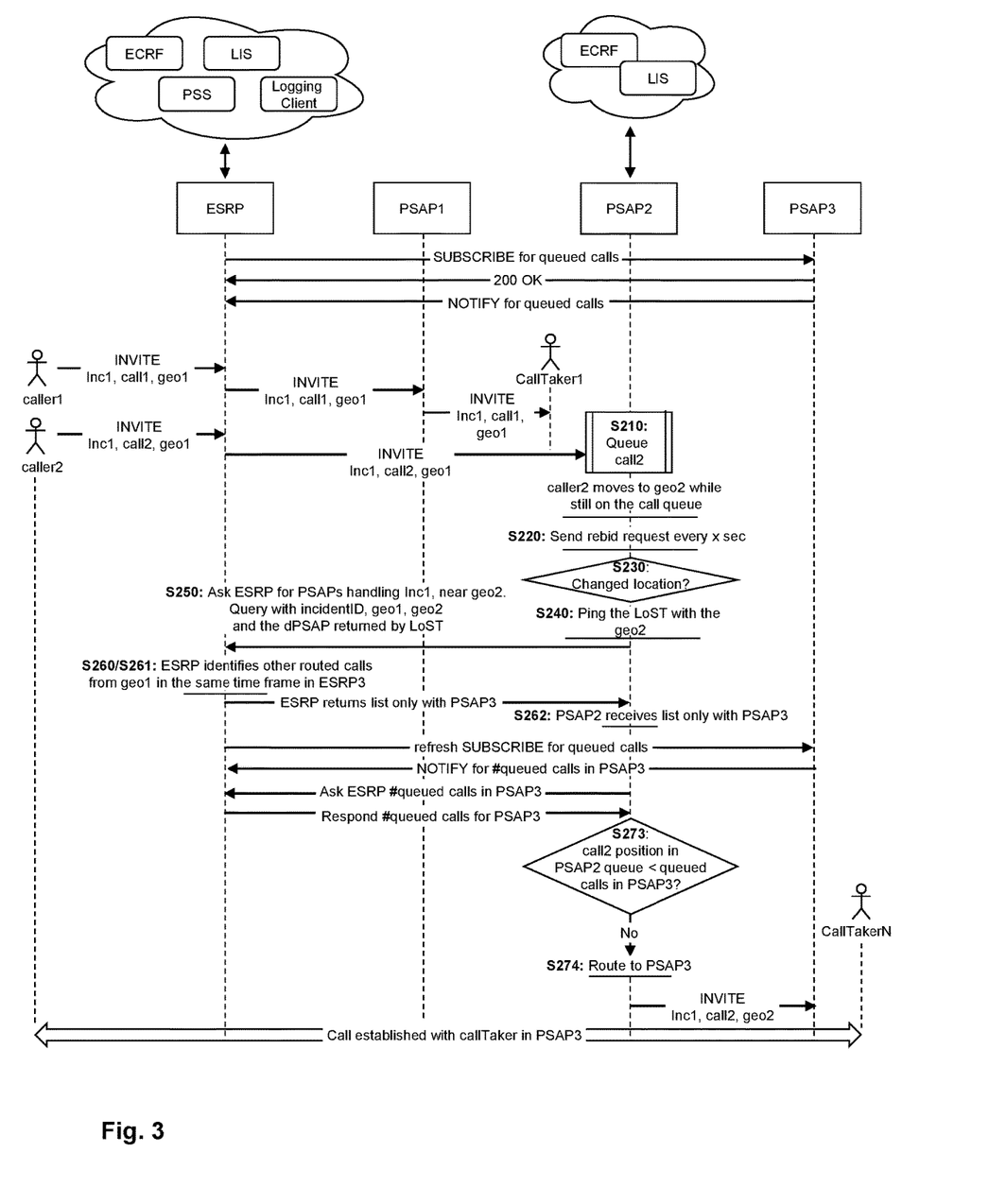
FIG. 3 shows a flowchart of the method according to another embodiment of the invention.

FIG. 3 shows a flowchart of the method according to another embodiment of the invention. This embodiment exemplifies the method, by presenting an emergency caller (caller1) which initiates a call (call1) from a FIRST geolocation (geo1) to an emergency network comprising an ESPR, several PSAPs, an ECRF, a LIS, a Policy Store Server (PSS) and at least a logging Client. In step S210, caller2 initiates an emergency call (call2) for incident 1 (Inc1) also from the FIRST geolocation (geo1), which sticks on the PSAP2 call queue. While caller2 is waiting in the queue, it changes its geographic position to geolocation B (locB). In step S220, an internal periodic mechanism performs a location discovery query for this call2, in order to identify if the position of the caller2 has changed. In the next step S240 PSAP2 pings a LoST server to receive a destination PSAP (dPSAP) for the new geolocation (geo2) of the caller2, in this case dPSAP is PSAP3. At this point PSAP2 does not know if PSAP3 has already handled incident 1. On the contrary, PSAP2 should most probably have already received calls for this incident. In this direction, even the meaningful action would be to deliver the call on the PSAP which is closer to the caller2 location, say PSAP3, it would be also wise to select the PSAP that will accelerate the incident handling, even if this is different from PSAP2. It is stressed that the acceleration of the handling process of an emergency call could be achieved in case the PSAP has already handled a similar incident.

In step S250, PSAP2 sends a query to the ESRP with the incidentID (Inc1) of the call2, the first and the second geolocation data (geo1, geo2), and the dPSAP received. The first check in ESRP is not true in step S260 due to no functional PSAP handling calls for Inc1 at the second geolocation (geo2). Thus, the ESRP performs the second check S261. With this check it tracks a call which was routed on PSAP3 this call was performed with a radius<x to the first geolocation (geo1) of the initial caller. Additionally, it was performed almost at the same time period. PSAP2 receives the response in S262 and checks S270 whether the PSAP3 (fPSAP) returned by the ESRP is similar to the PSAP3 (dPSAP) that was found by location discovery in S240. In this case, fPSAP is identical to dPSAP. After PSAP2 knows where to route the call2, it asks ESRP which is the length of the call queue for this PSAP3. The call queue length of PSAP3 is smaller than the actual position of the caller2 in PSAP2 queue S273, and thus call2 is routed on the new PSAP3 S274.

Figure 4:
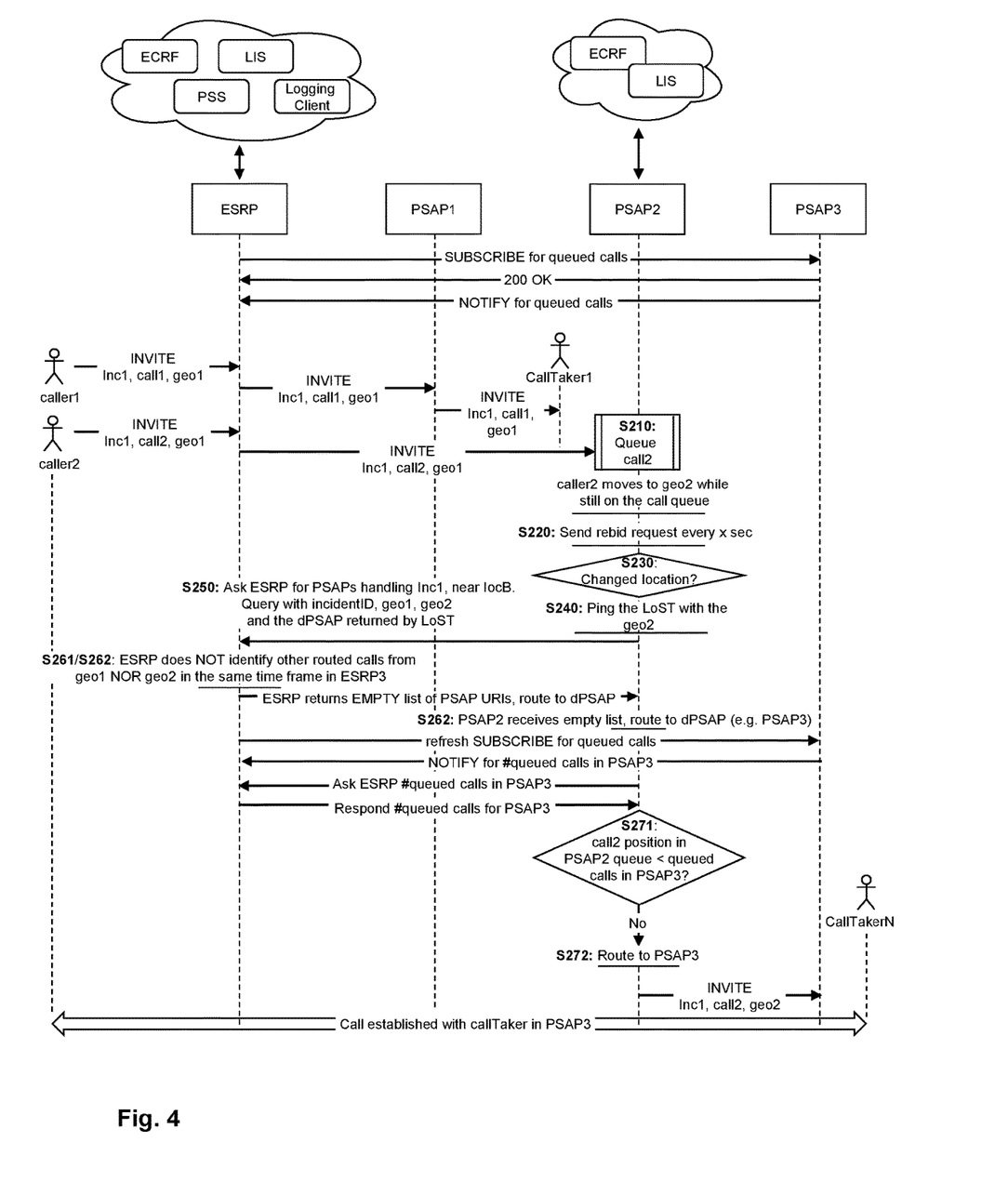
FIG. 4 shows another flowchart of the method according to another embodiment of the invention.

FIG. 4 shows another flowchart of the method according to another embodiment of the invention. This embodiment exemplifies the method taking into account a different approach of the use case described in the embodiment according to FIG. 3. Here, PSAP2 performs a ECRF request in step S240 to retrieve the new PSAP3 (dPSAP). At this point PSAP2 does not know if PSAP3 has already handled incident 1. In step S250, PSAP2 sends a query to the ESRP with the incidentID (Inc1) of the call2, the first and the second geolocation data (geo1, geo2). However, there is no match in ESRP as described in the embodiment in FIG. 3 for the second geolocation data (geo2) in step S260. Then, PSAP2 sends a second query in step S261 to the ESRP with the incidentID (Inc1) but only the first geolocation data (geo1). Again, there is no match in ESRP. Since there isn't correlation of an existing emergency incident in the ESRP for the incidentID (Inc1) and the geolocation data (geo1, geo2), PSAP2 takes the initiative to address this issue by reducing the time to respond in this latter emergency incident. PSAP2 checks itself queue size compared to the queue size of the PSAP3 in step S271. If the queue size of the PSAP2 is smaller than the queue size of the PSAP3, just update this latter emergency incident with the updated (second) geolocation data (geo2) without any change in the queue of the PSAP2 in step S280. Otherwise in step S272, PSAP2 triggers ESRP to route this latter emergency incident to the PSAP3 including the updated (second) geolocation data offering a reduced time to respond in an emergency incident (increased Quality of Service, QoS).

According to yet another preferred embodiment which can be a supplement to the embodiments of FIG. 3 or FIG. 4, the following further steps can take place. If the call2 is ready to be established with the CallTakerN, an update of the location of the caller2 will be done. The data can be processed as described in the other embodiments and will be presented to the CallTakerN. The CallTakerN is now aware that the caller2 is a moving caller, all retrieved location, transfers, a proposed PSAP (or a list of PSAPs) and the information about the call queue of that PSAP(s) will be displayed. With that information the CallTakerN can decide to establish the call2 or transfer the call2 to a more suitable PSAP.

Additional or alternative to the embodiments shown and described in FIG. 3 or FIG. 4 the following steps of the method can take place differently. Alternatively, in step S220 there won't be a fixed timer for the rebid request. If after the first rebid request the caller is identified as a moving caller the polling frequency can be increased, otherwise it can be decreased. This has the consequence that the moving caller location is handled more often, to have a more accurate decision about transferring the moving caller to another PSAP and on the other side does not overload the system with too many rebid requests about a non-moving caller.

The current queue position of the call2 and the queue position of the call2 in the proposed PSAP (PSAP3 in FIG. 3 or FIG. 4) is another criterion to decide whether the call is transfected in steps S271/S273. Alternatively, the absolute position in the queue is not used, but the filling level of the queue can be used as a reference point. For calculation of the relative queue position of the call2 in the origin PSAP2 ($rPos_2$), the current queue position of call2 ($Pos2$) and the maximum queue size of PSAP2 ($mQ_2$) can be used according to the following equation2:

$$rPos_2 = Pos_2/mQ_2 \quad \text{(equation2)}$$

For the calculation of relative queue position of the call2 in the proposed PSAP3 ($rPos_3$), the current number of calls in the queue of PSAP3 ($Pos_3$) and the maximum queue size ($mQ_3$) will be used according to the following equation3:

$$rPos_3 = Pos_3/mQ_3 \quad \text{(equation3)}.$$

If $rPos_3$ is lower than $rPos_2$ ($rPos_3 < rPos_2$) it could be assumed that the time in call queue of PSAP3 is not longer than in PSAP2 and the call2 could be routed to PSAP3.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for improving emergency response time for mobile callers, comprising:
    queuing, by a Public Safety Answering Point (PSAP) element, an emergency call having a first geolocation and an incident identifier (incidentID) associated with a caller,
    sending, by the PSAP element, a first rebid request to a Location Information Server (LIS) to get information about the current geolocation of the caller,
    identifying, by the PSAP, if the first geolocation of the caller has changed;
    in response to identifying that the first geolocation of the caller has changed:
        receiving, by the PSAP element, a second geolocation of the caller from the LIS,
        pinging, by the PSAP element, a Location to Service Translation, (LoST) element with the second geolocation of the caller,
        receiving, by the PSAP element, a destination PSAP (dPSAP) for the second geolocation of the caller from the LoST element, and
    routing the call to dPSAP.

2. The method according to claim 1, wherein the first geolocation having a radius $r<x$ in relation to an incident scene and the second geolocation having a radius $r>x$ in relation to the incident scene, wherein x is a distance parameter.

3. The method according to claim 2, wherein the sending of the first rebid request is periodically performed with a preconfigured polling frequency.

4. The method of claim 1, further comprising:
    in response to identifying the caller as a moving caller, increasing a polling frequency; and
    in response to identifying the caller as a non-moving caller, decreasing the polling frequency.

5. The method according to claim 1, wherein an initial time, t0, is a time the call is routed at the PSAP and a first time, t1, is a time the call is queued in the queue of the PSAP, wherein t1>t0.

6. The method of claim 1, further comprising:
    pinging an ESRP element, by the PSAP element, with the incidentID, the first geolocation, the second geolocation, and the dPSAP element, to identify whether other emergency calls were routed from the ESRP element, identifying, by the ESRP element, if another functional PSAP (fPSAP) can handle calls with the incidentID for the first geolocation or the second geolocation, receiving, by the PSAP element, at least one fPSAP destination from the ESRP element for the incidentID, identifying, by the PSAP element, if the dPSAP matches any fPSAP destination, and, in response to no match or the PSAP element has not received any fPSAP destination form the ESRP, routing call to dPSAP, otherwise routing call to the fPSAP.

7. The method according to claim 6, wherein an equation to identify an appropriate fPSAP is used by the ESRP element, the equation being:

$$\lim_{\substack{x \to geo1 \\ \delta \to t0}} f(x, t) = 0, \; f(x, t) = x - x_{or} + (t - t0)$$

with x is a distance parameter converging to the first geolocation, geo1, δ is a time parameter converging to t0, t is time and $x_{or}$ is the geolocation from which the call was placed at t0.

8. The method according to claim 6, comprising:

using a preconfigured policy rule function (PRF) to identify an appropriate dPSAP and/or fPSAP.

9. The method according to claim 6, wherein:

in response to no match or the PSAP element having not received any fPSAP destination from the ESRP, the method comprising:

identifying, by the PSAP, if the absolute queue position or the relative queue position of the call in the dPSAP is smaller as in its own queue, and, if yes, routing call to the dPSAP; and in case there is a match, the method comprising:

identifying, by the PSAP, if the absolute queue position or the relative queue position of the call in the fPSAP is smaller as in its own queue and, if yes, routing call to the fPSAP, and in any other case, remaining the call in the queue of the PSAP element.

10. The method according to claim 9, wherein the relative queue position is calculated by use of:

$$rPos_{PSAPn} = \frac{Pos_{PSAPn}}{mQ_{PSAPn}}$$

with $rPos_{PSAPn}$ is the relative queue position of a call in PSAPn, $Pos_{PSAPn}$ is the current queue position of a call, $mQ_{PSAPn}$ is the maximum queue size and PSAPn is a certain PSAP with identifier n.

11. The method of claim 1, wherein the LoST element is at least one of a LoST server, an Emergency Call Routing Function (ECRF) server or a Location Validation Function (LVF) server and/or wherein these elements use at least one of a ECRF protocol, a LoST protocol or a LVF, protocol.

12. A system for improving emergency response time for mobile callers, wherein the system is configured to perform the method of claim 1.

13. The system according to claim 12, wherein the system comprising an ESRP element, an ECRF or LoST element, a LIS element, a PSAP element and a dPSAP element.

14. The system according to any of the claim 13 wherein the system further comprising a fPSAP element, a Policy Store Server, PSS element and/or Logging Client.

15. A communication apparatus comprising:

a device having a processor connected to a non-transitory memory and at least one transceiver, the device configured to perform a method comprising:

queuing an emergency call having a first geolocation and an incident identifier (incidentID) associated with a caller, sending a first rebid request to a Location Information Server (LIS) to get information about the current geolocation of the caller, in response to identifying that the first geolocation of the caller has changed based on the information about the current geolocation of the caller:

receiving a second geolocation of the caller from the LIS, pinging a Location to Service Translation (LoST) element with the second geolocation of the caller, receiving a destination PSAP (dPSAP) for the second geolocation of the caller from the LoST element, and routing the call to the dPSAP.

* * * * *